United States Patent [19]
Smith

[11] 3,988,906
[45] Nov. 2, 1976

[54] FLEXIBLE COUPLING

[76] Inventor: Thomas R. Smith, 710 W. 11th St. South, Newton, Iowa 50208

[22] Filed: Aug. 1, 1975

[21] Appl. No.: 601,099

[52] U.S. Cl. ................................. 64/12; 64/11 R; 403/291
[51] Int. Cl.² ............................................. F16D 3/52
[58] Field of Search ................... 285/229, 235, 226; 403/310, 309, 291; 64/12, 11 R

[56] References Cited
UNITED STATES PATENTS

| 2,840,998 | 7/1958 | Reich | 64/12 |
|---|---|---|---|
| 2,901,896 | 9/1959 | Reich | 64/11 R |
| 2,901,897 | 9/1959 | Reich | 64/12 X |
| 2,945,365 | 7/1960 | Ulderup et al. | 64/11 R |
| 3,095,714 | 7/1963 | Schlotmann | 64/11 R |
| 3,224,224 | 12/1965 | Kudriavetz, Jr. | 64/11 R |
| 3,250,090 | 5/1966 | Thompson | 285/229 X |
| 3,469,417 | 9/1969 | Wakelin | 64/12 |
| 3,747,367 | 7/1973 | Muller | 285/226 X |
| 3,823,577 | 7/1974 | Smith | 64/11 R |

FOREIGN PATENTS OR APPLICATIONS

| 6,802,270 | 8/1968 | Netherlands | 285/226 |
|---|---|---|---|

Primary Examiner—Thomas F. Callaghan

[57] ABSTRACT

A drive coupling having a flexible web joining a pair of hubs and including at least one undulation. The undulation has an axis extending substantially at a right angle to the longitudinal axis of the coupling with all sections of the web cut by transverse planes normal to the longitudinal axis of the coupling being substantially parallel.

7 Claims, 6 Drawing Figures

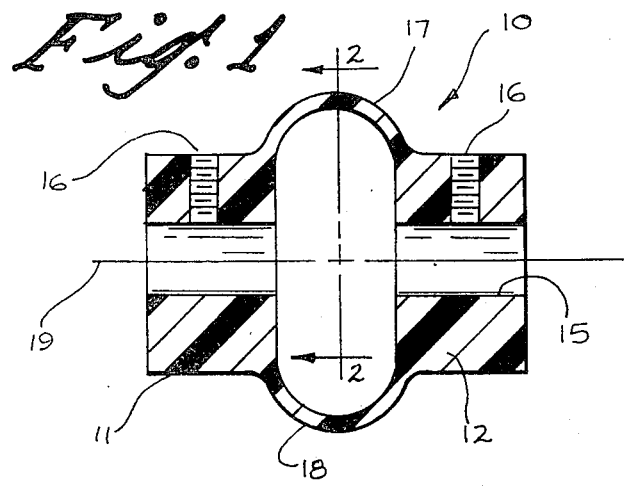
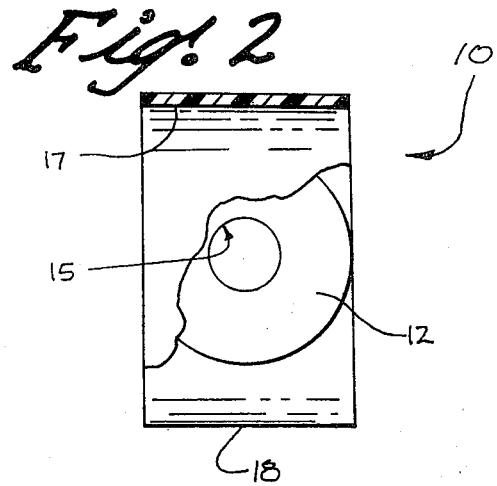
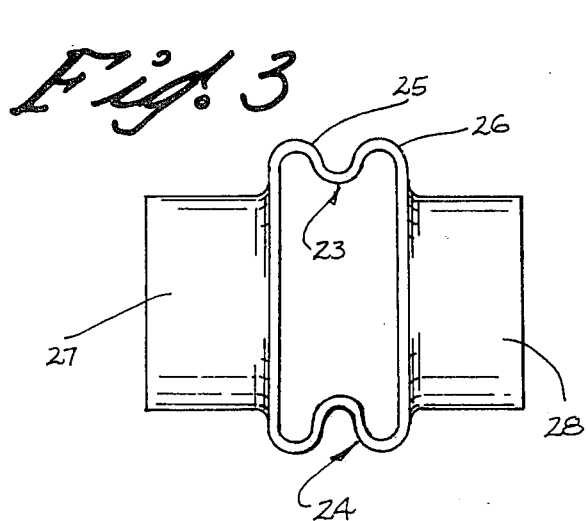
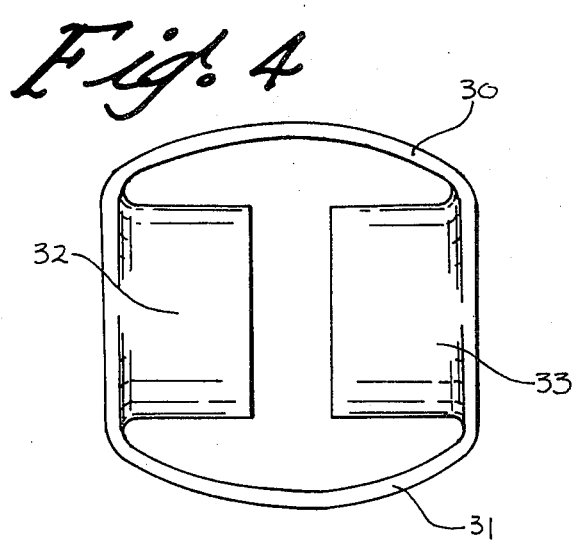
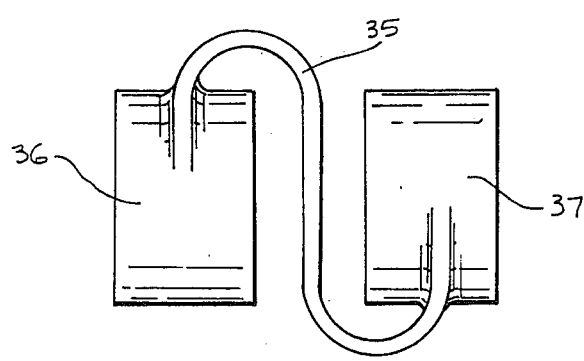
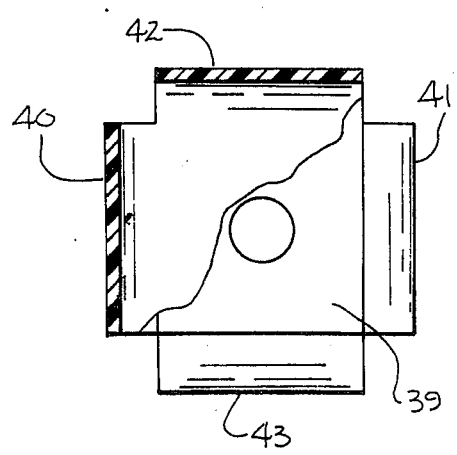

FLEXIBLE COUPLING

BACKGROUND OF THE INVENTION

1. Field of the Invention

This invention relates to drive couplings and more particularly to a flexible coupling.

2. Description of the Prior Art

Flexible couplings for accommodating impact, vibration, and misalignment between driving and driven members have previously been shown in prior art. Previous devices, however, have been somewhat complicated assemblies of several components, have been expensive because of the several components and assembly labor, and have been limited in degree of loading or misalignment that could be accommodated. There is thus a continuing need for a simple, low cost, versatile flexible drive coupling.

SUMMARY OF THE INVENTION

It is an object of the instant invention to provide an improved low cost flexible drive coupling.

It is a further object of the instant invention to provide an improved flexible coupling having an undulating flexible web connecting a driving and a driven hub.

The instant invention achieves these objects in a flexible coupling having a pair of hubs connected by a flexible web or webs of material substantially flat along an axis at a right angle to the longitudinal axis of the coupling with all sections of the web cut by a transverse plane at right angles to, or normal to, the longitudinal axis of the coupling being substantially parallel.

Specific construction of the improved flexible coupling and further objects and advantages thereof will become evident as the description proceeds and from an examination of the accompanying sheet of drawings.

BRIEF DESCRIPTION OF THE DRAWINGS

The drawings illustrate a preferred embodiment of the invention with similar numerals referring to similar parts throughout the several views wherein:

FIG. 1 is a longitudinal section view of the flexible coupling of the present invention;

FIG. 2 is an end view of the coupling of FIG. 1 shown partially in section at the line 2—2 in FIG. 1;

FIGS. 3, 4, and 5 are side views of alternate embodiments of the instant invention; and FIG. 6 is an end view, partially in section, showing further alternate embodiments of the instant invention.

DESCRIPTION OF A PREFERRED EMBODIMENT

Referring to FIG. 1 the flexible coupling 10 includes generally axially aligned driving hub 11 and driven hub 12. Each hub may be circular in cross section, as in FIG. 2, and incudes a longitudinally extending central bore 15 for receiving a driving or driving member such as a shaft. A set screw (not shown) may be used with a threaded hole 16 to rigidly connect the hub 11 or 12 to a shaft in the central bore 15. Also the hubs may be provided with splines, key ways, or any other desired construction for fastening the hubs to the shafts.

A pair of flexible webs 17 and 18 connect the adjacent driving and driven hubs 11 and 12. As in FIG. 1, the web 17, for example, is arcuate in a plane extending along the longitudinal axis or is formed with a single curve or undulation having an axis of undulation extending transversely relative to the coupling 10 or approximately at a right angle to the longitudinal axis 19 of the coupling 10. The web 17 is thus transversely straight or flat in FIG. 2 which shows a section of the web cut by a plane normal to the longitudinal axis of the coupling.

The coupling 10 of FIGS. 1 and 2 is shown as a unitary member and may be molded of a material such as polycarbonate.

The alternate embodiment of FIG. 3 is similar to FIG. 1 but includes a pair of connecting webs 23 and 24 with each having a plurality of undulations 25 and 26, for example, between, in this embodiment, the adjacent faces of the driving and driven hubs 27 and 28. It is noted that the webs 23, 24 are transversely straight or flat relative to the axes of curvature of the undulation.

Referring to FIG. 4, a further alternate embodiment includes a pair of interconnecting webs 30 and 31 that connect the opposite ends of the driving and driven hubs 32 and 33 instead of the adjacent faces as in FIGS. 1 and 3.

A single web 35 connects the driving and driven hubs 36 and 37 at a point intermediate the ends of each hub in the embodiment of FIG. 5. Each of the embodiments of FIGS. 1, 3, 4 and 5 may be simply formed as unitary flexible couplings. It has thus been shown that the web may have different shapes and may be attached at different points on the hubs.

Referring to FIG. 6 a still further alternate embodiment suggests that the hubs such as hub 39 may be square in cross section as well as circular. Other shapes may also be used. FIG. 6 also suggests the use of two pair of arcuate webs 40, 41 and 42, 43 connecting the pair of hubs.

It is thus clear that the instant invention provides an improved flexible coupling that is low cost by virtue of its simple construction and operable for accommodating a wide range of operating conditions.

In the foregoing drawings and specification, there has been set forth a preferred embodiment of the invention and although specific terms are employed, these are used in a generic and descriptive sense only and not for purposes of limitation. Changes in form and the proportion of parts are contemplated as circumstances may suggest or render expedient without departing from the spirit or scope of this invention.

I claim:

1. A unitary one piece flexible coupling for transmitting rotational torque comprising: a relatively rigid drive hub connectable to a driving member; a relatively rigid driven hub connectable to a driven member; and at least one relatively thin web formed of the same material as said hubs integrally with and thereby joining said driven hub to said driven hub and including at least one undulation in said web, said web having an axis of curvature extending substantially at a right angle to the longitudinal axis of said hubs with all sections of the web cut by a transverse plane at right angles to the longitudinal axis of the coupling being substantially parallel, said undulating thin web forming a relatively flexible connection between said relatively rigid hubs.

2. A flexible coupling as defined in claim 1 wherein a pair of said flexible webs are disposed on opposite sides of the longitudinal axis of said hubs.

3. A flexible coupling as defined in claim 1 wherein said hubs and webs comprise a unitary molding of polycarbonate material.

4. A unitary one piece flexible coupling for transmitting rotational torque comprising: a relatively rigid drive hub connectable to a driving member; a relatively rigid driven hub generally aligned with said drive hub and connectable to a driven member; and at least one unitary relatively thin web formed of the same material as said hubs integrally with and thereby joining said hubs and including at least one undulation in said web, said web having an axis of undulation extending substantially at a right angle to the longitudinal axis of said hubs and being flat in the direction of said axis of undulation with all sections of the web cut by a transverse plane at right angles to the longitudinal axis of the coupling being substantially parallel, said undulating thin web forming a relatively flexible connection between said relatively rigid hubs.

5. A flexible coupling as defined in claim 4 wherein a pair of webs are disposed on opposite sides of the longitudinal axis of said hubs.

6. A flexible coupling as defined in claim 4 wherein a single s-shaped web joins said drive hub to said driven hub.

7. A flexible coupling as defined in claim 4 wherein said hubs and web comprise a unitary one piece molding of polycarbonate material.

* * * * *